United States Patent
Mekata et al.

(10) Patent No.: US 12,216,138 B2
(45) Date of Patent: Feb. 4, 2025

(54) ROTATION SPEED DETECTOR

(71) Applicant: Mitsubishi Electric Corporation, Tokyo (JP)

(72) Inventors: Toshio Mekata, Tokyo (JP); Takeshi Musha, Tokyo (JP); Hitoshi Hasegawa, Tokyo (JP); Takuya Noguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/707,180

(22) PCT Filed: May 16, 2022

(86) PCT No.: PCT/JP2022/020409
§ 371 (c)(1),
(2) Date: May 3, 2024

(87) PCT Pub. No.: WO2023/223389
PCT Pub. Date: Nov. 23, 2023

(65) Prior Publication Data
US 2024/0418740 A1    Dec. 19, 2024

(51) Int. Cl.
*G01P 3/44* (2006.01)
*G01P 3/481* (2006.01)
*G01P 3/487* (2006.01)

(52) U.S. Cl.
CPC ............... *G01P 3/44* (2013.01); *G01P 3/481* (2013.01); *G01P 3/4815* (2013.01); *G01P 3/487* (2013.01)

(58) Field of Classification Search
CPC .. G01P 3/487; G01P 3/44; G01P 3/481; G01P 3/4815; G01P 3/4807
See application file for complete search history.

(56) References Cited

U.S. PATENT DOCUMENTS 5,004,981 A     4/1991  Hashimoto et al.
9,803,998 B1   10/2017  Schrubbe
(Continued)

FOREIGN PATENT DOCUMENTS

JP    S56-84717 U    7/1981
JP    S59-78917 U    5/1984
(Continued)

OTHER PUBLICATIONS

International Search Report and Written Opinion mailed on Jul. 12, 2022, received for PCT Application PCT/JP2022/020409, filed on May 16, 2022, 10 pages including English Translation.
(Continued)

*Primary Examiner* — Neel D Shah
*Assistant Examiner* — Adam S Clarke
(74) *Attorney, Agent, or Firm* — XSENSUS LLP

(57) ABSTRACT

A rotation speed detector includes: a base material to be attached to a rotating body; a first magnetic pole having an arcuate strip shape and provided on the base material; a second magnetic pole having an arcuate strip shape and provided on the base material; and a power generation element including a magnetic wire configured to cause a large Barkhausen effect, and a pickup coil. The power generation element is arranged to face the first magnetic pole and the second magnetic pole so that a longitudinal direction of the magnetic wire is provided along a radial direction of the first magnetic pole and the second magnetic pole. A non-magnetic gap is provided between the first magnetic pole and the second magnetic pole.

2 Claims, 6 Drawing Sheets

(56) References Cited

U.S. PATENT DOCUMENTS

2013/0046488 A1* 2/2013 Donovan ............... G01P 3/489
                                                    702/57
2015/0015245 A1* 1/2015 Inoue ..................... G01D 5/12
                                                    324/207.13
2018/0340799 A1 11/2018 Goto
2019/0310163 A1* 10/2019 Lang ..................... F16C 33/46

FOREIGN PATENT DOCUMENTS

| JP | H02-243964 A  | 9/1990  |
| JP | 2008-185561 A | 8/2008  |
| JP | 2018-054489 A | 4/2018  |
| JP | 2018-189426 A | 11/2018 |
| JP | 2021-012212 A | 2/2021  |

OTHER PUBLICATIONS

Decision to Grant a Patent mailed on Dec. 13, 2022, received for JP Application 2022-562859, 5 pages including English Translation.

* cited by examiner

ROTATION SPEED DETECTOR

CROSS-REFERENCE TO RELATED APPLICATION

This application is a national stage application, pursuant to 35 U.S.C. § 371, of International Patent Application No. PCT/JP2022/020409, filed May 16, 2022, the entire contents of which are incorporated herein by reference.

FIELD

The present disclosure relates to a rotation speed detector that detects a rotation speed indicating a rotational speed of a rotating body.

BACKGROUND

When the number of rotations per unit time of a rotating body such as a shaft, that is, a rotation speed indicating a rotational speed is detected, a power generation element including a magnetic wire that generates a large Barkhausen effect and a pickup coil that detects magnetization reversal of the magnetic wire is used. Patent Literature 1 discloses a rotation speed detector that includes a first magnetic pole portion of which an outer peripheral side serves as an N pole, a second magnetic pole portion of which an outer peripheral side serves as an S pole, and a power generation element. In the rotation speed detector disclosed in Patent Literature 1, when a magnetic pole portion facing the power generation element is switched from one of the first magnetic pole portion and the second magnetic pole portion to the other one, a direction of a magnetic field applied to the magnetic wire of the power generation element is switched, and when the magnetic field becomes equal to or more than a certain size, a power generation pulse is generated by the magnetization reversal of the magnetic wire. By attaching the rotation speed detector to the rotating body and measuring the number of power generation pulses caused by the magnetization reversal, the rotation speed of the rotating body is detected.

CITATION LIST

Patent Literature

Patent Literature 1: Japanese Patent Application Laid-open No. 2021-012212

SUMMARY OF INVENTION

Problem to be Solved by the Invention

However, in the rotation speed detector disclosed in Patent Literature 1, the first magnetic pole portion and the second magnetic pole portion are arranged to be adjacent to each other with no gap. Therefore, in the rotation speed detector disclosed in Patent Literature 1, when the magnetic pole portion facing the power generation element is switched from one of the first magnetic pole portion and the second magnetic pole portion to the other one, the direction of the magnetic field applied to the magnetic wire of the power generation element is suddenly switched. Therefore, in the rotation speed detector disclosed in Patent Literature 1, when the rotating body to which the rotation speed detector is attached is vibrated in the rotation direction, in a state where a boundary portion between the first magnetic pole portion and the second magnetic pole portion faces the power generation element, magnetic fields in different directions with a size equal to or more than a certain size are alternately and repeatedly added to the magnetic wire. Therefore, if the rotating body, attached in a state where the boundary portion between the first magnetic pole portion and the second magnetic pole portion faces the power generation element, vibrates in the rotation direction, the rotation speed detector disclosed in Patent Literature 1 detects the rotation although the rotation of the rotating body is stopped.

In this way, the rotation speed detector disclosed in Patent Literature 1 has erroneously detected the rotation of the rotating body, when the rotating body to which the rotation speed detector is attached vibrates in the rotation direction.

The present disclosure has been made in view of the above, and an object of the present disclosure is to obtain a rotation speed detector that is less likely to erroneously detect rotation of a rotating body, even if the attached rotating body vibrates in a rotation direction.

Means to Solve the Problem

To solve the above problems and achieve the object, a rotation speed detector according to the present disclosure includes: a non-magnetic base material to be attached to a rotating body; a first magnetic pole having an arcuate strip shape and provided on the base material so that an outer peripheral side serves as an N pole and an inner peripheral side serves as an S pole; a second magnetic pole having an arcuate strip shape and provided on the base material so that an outer peripheral side serves as the S pole and an inner peripheral side serves as the N pole; and a power generation element including a magnetic wire configured to cause a large Barkhausen effect, and a pickup coil configured to detect magnetization reversal of the magnetic wire. The power generation element is provided to face the first magnetic pole and the second magnetic pole so that a longitudinal direction of the magnetic wire is provided along a radial direction of the first magnetic pole and the second magnetic pole. A non-magnetic gap is provided between the first magnetic pole and the second magnetic pole.

Effects of the Invention

A rotation speed detector according to the present disclosure has an effect of being less likely to erroneously detect rotation of a rotating body even if the attached rotating body vibrates in a rotation direction.

DESCRIPTION OF EMBODIMENTS

Hereinafter, a rotation speed detector according to embodiments will be described in detail with reference to the drawings.

First Embodiment

Figure 1:
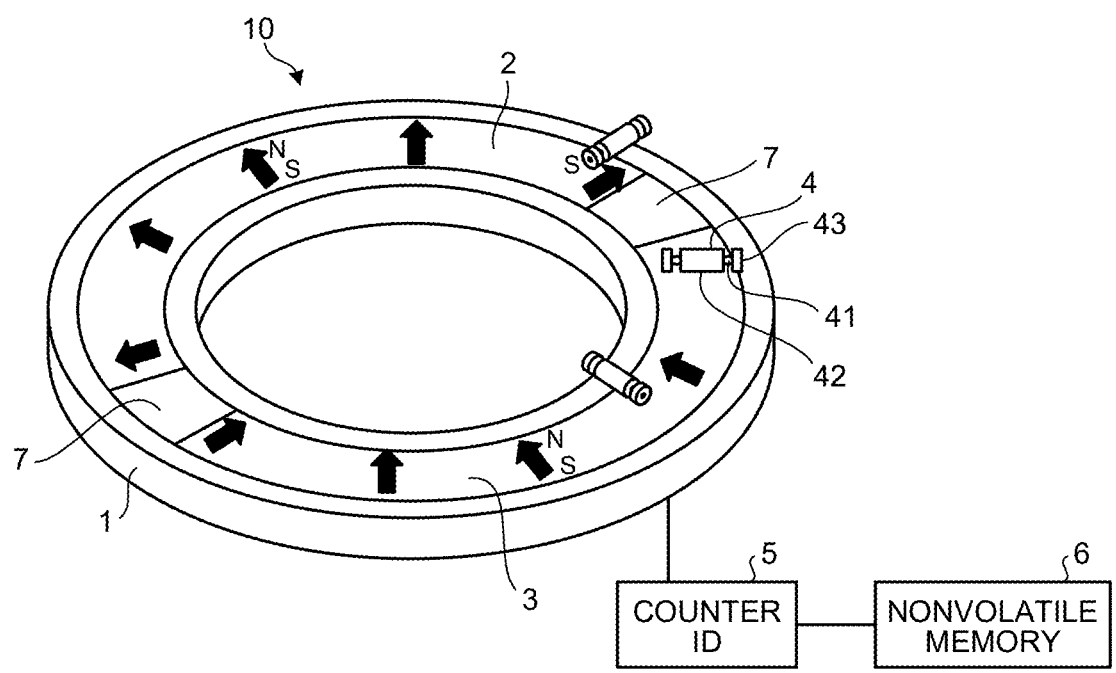
FIG. 1 is a diagram illustrating a configuration of a rotation speed detector according to a first embodiment.

FIG. 1 is a diagram illustrating a configuration of a rotation speed detector according to a first embodiment. A rotation speed detector 10 according to the first embodiment includes: a base material 1 fixed to a rotating body such as a shaft; a first magnetic pole 2 and a second magnetic pole 3 provided on the base material 1; a power generation element 4 provided to face the first magnetic pole 2 and the second magnetic pole 3; a counter integrated circuit (IC) 5 that operates with a power generation pulse generated by the power generation element 4 as a trigger; and a nonvolatile memory 6 in which data of a rotation speed is written by the counter IC 5. The rotation speed detector 10 measures a rotation speed of the rotating body by updating the data of the rotation speed in the nonvolatile memory 6 by the counter IC 5 each time when the power generation pulse is generated in the power generation element 4.

Each of the first magnetic pole 2 and the second magnetic pole 3 has an arcuate strip shape. The first magnetic pole 2 is magnetized so that an outer peripheral side serves as an N pole and an inner peripheral side serves as an S pole. The second magnetic pole 3 is magnetized so that an outer peripheral side serves as the S pole and an inner peripheral side serves as the N pole. That is, the first magnetic pole 2 is magnetized outward in a radial direction, and the second magnetic pole 3 is magnetized inward in the radial direction. Note that a black arrow in FIG. 1 indicates a magnetization direction of each of the first magnetic pole 2 and the second magnetic pole 3.

An outer diameter of the first magnetic pole 2 is the same as an outer diameter of the second magnetic pole 3. Furthermore, an inner diameter of the first magnetic pole 2 is the same as an inner diameter of the second magnetic pole 3. A center of an arc of the inner and outer diameters of the first magnetic pole 2 is the same as a center of an arc of the inner and outer diameters of the second magnetic pole 3.

The first magnetic pole 2 and the second magnetic pole 3 may be bonded to the base material 1 or may be integrated with the base material 1.

A gap 7 where the base material 1 is exposed is provided between the first magnetic pole 2 and the second magnetic pole 3. The gap 7 is provided in a certain angular range, with the center of the arc of the inner and outer diameters of the first magnetic pole 2 and the second magnetic pole 3 as a center point. Therefore, the gap 7 is narrower on the inner diameter side of the first magnetic pole 2 and the second magnetic pole 3 and is wider on the outer diameter side. In the rotation speed detector 10 according to the first embodiment, the gap 7 is provided in an angular range of 20 degrees.

The power generation element 4 includes: a magnetic wire 41 configured to generate a large Barkhausen effect; a pickup coil 42 configured to detect magnetization reversal of the magnetic wire 41; and magnetic yokes 43 provided at both ends of the magnetic wire 41. The power generation element 4 is provided so that a longitudinal direction of the magnetic wire 41 is provided along the radial direction of the first magnetic pole 2 and the second magnetic pole 3. Although a configuration in which the three power generation elements 4 are provided is illustrated in FIG. 1, the number of power generation elements 4 is not limited to three. Furthermore, in a case where three or more power generation elements 4 are provided, an interval between the power generation elements 4 can be arbitrarily set. In the rotation speed detector 10 according to the first embodiment, the power generation element 4: generates a positive power generation pulse with a magnetic field having a magnetic flux density of +10 mT as a trigger; and generates a negative power generation pulse with a magnetic field having a magnetic field of −10 mT as a trigger.

Figure 2:
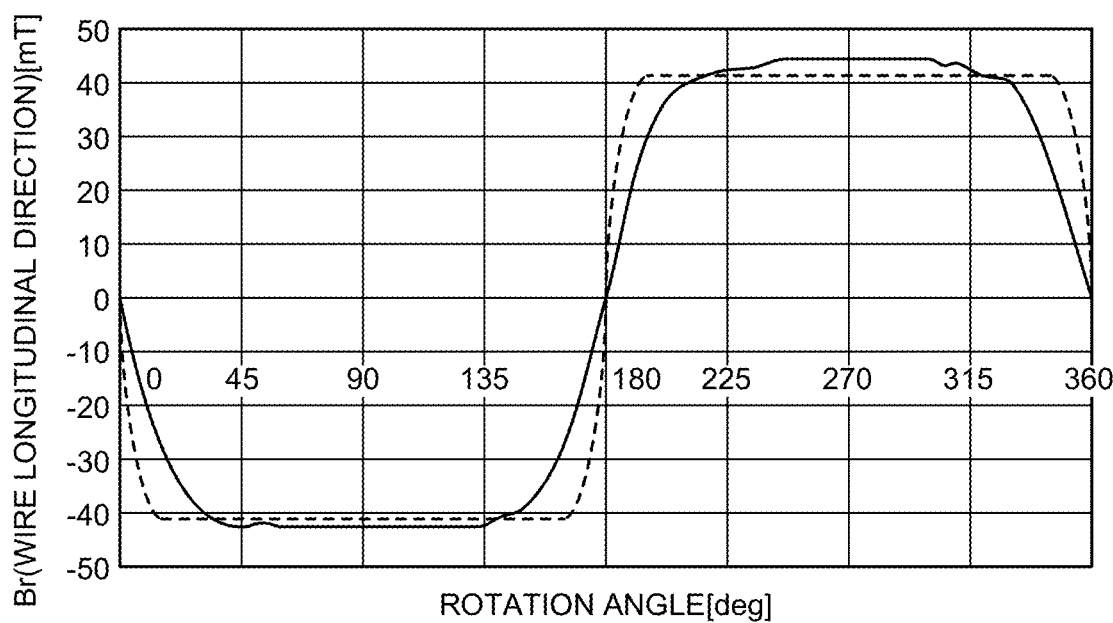
FIG. 2 is a diagram illustrating an example of a magnetic field generated by the rotation speed detector according to the first embodiment.

FIG. 2 is a diagram illustrating an example of a magnetic field generated by the rotation speed detector according to the first embodiment. In FIG. 2, a magnetic field generated by the rotation speed detector according to a comparative example in which the gap is not formed between the first magnetic pole and the second magnetic pole is illustrated together. Note that, in FIG. 2, a solid line indicates a magnetic field generated by the rotation speed detector 10 according to the first embodiment, and a broken line indicates a magnetic field generated by the rotation speed detector according to the comparative example.

In the rotation speed detector 10 according to the first embodiment, the first magnetic pole 2 is arranged in an angular range of 10 degrees to 170 degrees, and the second magnetic pole 3 is arranged in an angular range of 190 degrees to 350 degrees. The gap 7 is arranged between 350 degrees and 10 degrees and between 170 degrees and 190 degrees. On the other hand, in the rotation speed detector according to the comparative example, the first magnetic pole is arranged in an angular range of zero degree to 180 degrees, and the second magnetic pole is arranged in an angular range of 180 degrees to 360 degrees.

In the rotation speed detector according to the comparative example, the magnetic field rapidly changes from positive to negative or negative to positive, near a rotation angle of zero degree and near a rotation angle of 180 degrees. Therefore, in the rotation speed detector according to the comparative example, when vibration with a vibration width of about two degrees of the angle in the rotation direction is generated in the rotating body in a state where the power generation element faces a position near zero degree or 180 degrees, the magnetic field that exceeds ±10 mT to be the trigger is continuously generated, and a plurality of power generation pulses are generated within a period shorter than a rotation cycle of the rotating body. Therefore, in the rotation speed detector according to the comparative example, data is continuously written in the nonvolatile memory in a short time, and a failure in writing is likely to occur. Moreover, in a case where the vibration with the vibration width of about two degrees of the angle of the rotation direction of the rotating body is continuously generated, the positive and negative power generation pulses are continuously generated, and the data is continuously written into the nonvolatile memory. Therefore, the number of times of writing reaches an upper limit, and this shortens a life of the nonvolatile memory.

On the other hand, in the rotation speed detector 10 according to the first embodiment, since the gap 7 is provided between the first magnetic pole 2 and the second magnetic pole 3, a gradient of a change in the magnetic field when positive and negative of the magnetic field are switched is gentler than the rotation speed detector according to the comparative example. Thus, the magnetic field exceeding ±10 mT that is the trigger is not generated by vibration equal to or less than eight degrees of the angle in the rotation direction of the rotating body around the position of zero degree or 180 degrees. That is, in the rotation speed detector 10 according to the first embodiment, the gap 7 provided between the first magnetic pole 2 and the second magnetic pole 3 is set to be larger than the vibration width in the rotation direction generated in the rotating body. Therefore, in the rotation speed detector 10 according to the first embodiment, unlike the rotation speed detector according to the comparative example, even if the vibration with the vibration width of about two degrees of the angle in the rotation direction is generated in the rotating body in a state where the power generation element 4 faces the position near zero degree or 180 degrees, the power generation pulse is not generated, and the data is not written into the nonvolatile memory 6. Therefore, there is no concern about a decrease in reliability such that a writing failure occurs due to continuous writing into the nonvolatile memory 6 in a short time and the life of the nonvolatile memory 6 is shortened because the number of times of writing reaches the upper limit of the number of times of writing into the nonvolatile memory 6.

Note that, in the rotation speed detector 10 according to the first embodiment, it is preferable to set the gap 7 to be larger than the vibration width in the rotation direction generated in the rotating body. However, as far as the gap 7 is included, it is possible to suppress the generation of the power generation pulse even if the vibration of the rotating body in the rotation direction is generated in a state where the power generation element 4 faces the position near zero degree or 180 degrees. That is, by including the gap 7 between the first magnetic pole 2 and the second magnetic pole 3, even if the vibration of the rotating body in the rotation direction is generated in a state where the power generation element 4 faces the position near zero degree or 180 degrees, the rotation speed detector 10 according to the first embodiment can suppress the generation of the power generation pulse and suppress the data from being written into the nonvolatile memory 6. Therefore, it is possible to suppress the decrease in the reliability such that a writing failure occurs due to continuous writing into the nonvolatile memory 6 in a short time and the life of the nonvolatile memory 6 is shortened because the number of times of writing reaches the upper limit of the number of times of writing into the nonvolatile memory 6.

In the rotation speed detector 10 according to the first embodiment, an angle position where the magnetic field to be the trigger is generated is different between a case where the magnetic field changes from positive to negative and a case where the magnetic field changes from negative to positive. That is, in a case where the magnetic field changes from positive to negative, the magnetic field of −10 mT to be the trigger is generated when the rotation angle reaches 352 degrees, and in a case where the magnetic field changes from negative to positive, the magnetic field of +10 mT to be the trigger is generated when the rotation angle reaches eight degrees. Therefore, in the rotation speed detector 10 according to the first embodiment, a hysteresis H caused by the rotation direction of the rotating body is 16 degrees. By increasing the size of the gap 7 between the first magnetic pole 2 and the second magnetic pole 3, it is possible to increase the hysteresis H and make it hard to generate the magnetic field to be the trigger. For example, in the above description, the gap 7 between the first magnetic pole 2 and the second magnetic pole 3 is provided in an angular range of 20 degrees. However, by setting the angular range of the gap 7 to 30 degrees and increasing the value of the hysteresis H, even if the vibration with a magnitude of ±eight degrees of the angle in the rotation direction of the rotating body is generated, it is possible to prevent the generation of the magnetic field to be the trigger.

Figure 3:
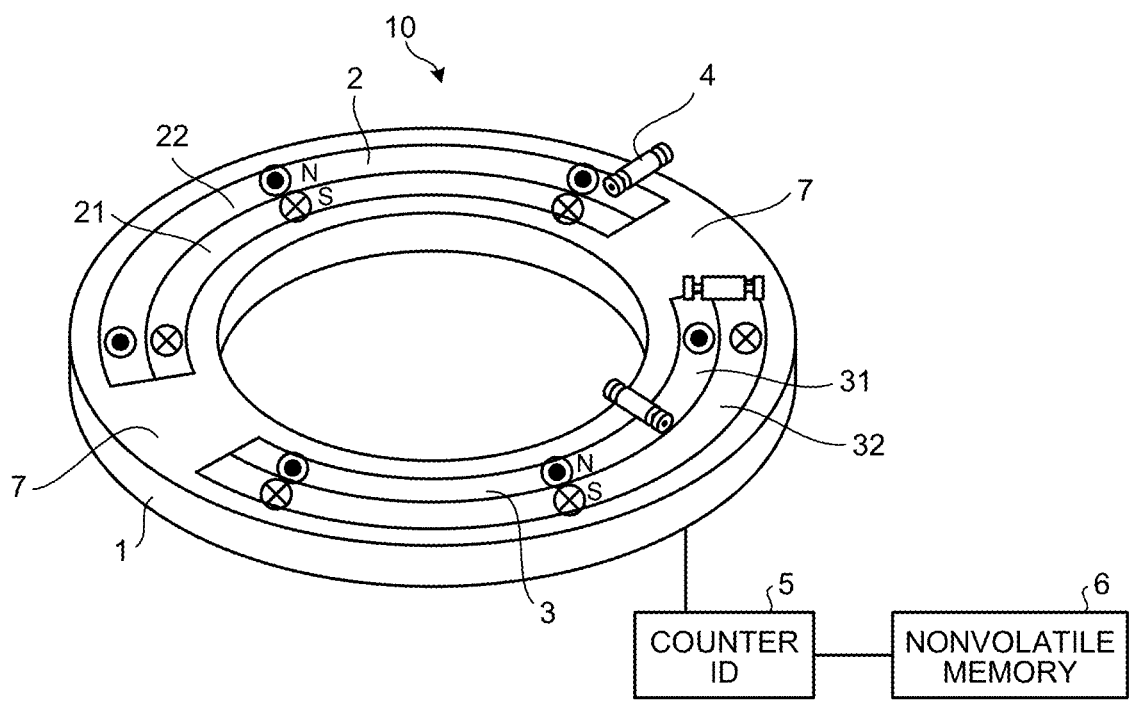
FIG. 3 is a diagram illustrating a configuration of the rotation speed detector according to a modification of the first embodiment.

FIG. 3 is a diagram illustrating a configuration of the rotation speed detector according to a modification of the first embodiment. In the rotation speed detector 10 according to the modification, the first magnetic pole 2 includes two magnets 21 and 22 magnetized in a thickness direction of the base material 1. In the rotation speed detector 10 according to the modification, the second magnetic pole 3 includes two magnets 31 and 32 magnetized in the thickness direction of the base material 1. A side of the magnet 21 on the inner peripheral side of the first magnetic pole 2, facing the power generation element 4 is the S pole. A side of the magnet 22 on the outer peripheral side of the first magnetic pole 2, facing the power generation element 4 is the N pole. A side of the magnet 31 on the inner peripheral side of the second magnetic pole 3, facing the power generation element 4 is the N pole. A side of the magnet 32 on the outer peripheral side of the second magnetic pole 3, facing the power generation element 4 is the S pole. In FIG. 3, for convenience of description, an x mark surrounded by a circle indicates that a magnetic flux is viewed along a traveling direction. Furthermore, in FIG. 3, for convenience of description, a circle mark surrounded by a circle indicates that the magnetic flux is viewed against the traveling direction.

Therefore, it is possible to realize the rotation speed detector 10 with no concern about the decrease in the reliability such that the writing failure occurs due to the continuous writing into the nonvolatile memory 6 in a short time and the life of the nonvolatile memory 6 is shortened because the number of times of writing reaches the upper limit of the number of times of writing into the nonvolatile memory 6, even if the magnets 21, 22, 31, and 32 magnetized in the thickness direction of the base material 1 are used.

In the rotation speed detector 10 according to the first embodiment, since the gap 7 is provided between the first magnetic pole 2 and the second magnetic pole 3, even if a minute vibration is generated at an intermediate position between the first magnetic pole 2 and the second magnetic pole 3, the rotation speed detector 10 does not generate power unless the size of the vibration is equal to or more than a half of the gap 7. Therefore, it is possible to suppress the decrease in the reliability due to constant power generation caused by the minute vibration. Note that, since a minute vibration amount differs according to a type of the rotating body that is a vibration generation source and a rotation control method, if the size of the gap 7 is appropriately set in accordance with the type of the rotating body and the rotation control method, the decrease in the reliability can be suppressed.

Second Embodiment

Figure 4:
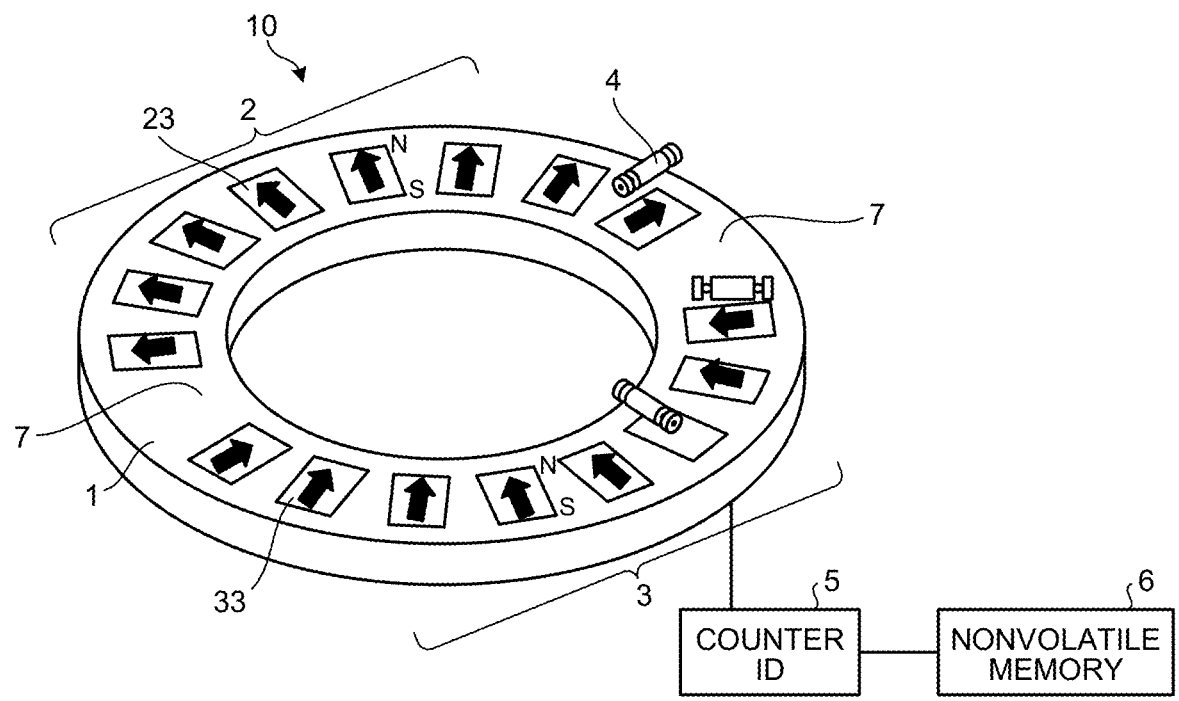
FIG. 4 is a diagram illustrating a configuration of a rotation speed detector according to a second embodiment.

FIG. 4 is a diagram illustrating a configuration of the rotation speed detector according to a second embodiment.

In the rotation speed detector 10 according to the second embodiment, the first magnetic pole 2 includes a plurality of bar magnets 23 arranged in an arcuate strip shape with intervals. Furthermore, in the rotation speed detector 10 according to the second embodiment, the second magnetic pole 3 includes a plurality of bar magnets 33 arranged in an arcuate strip shape with intervals. The bar magnet 23 included in the first magnetic pole 2 is arranged so that the outer peripheral side serves as the N pole and the inner peripheral side serves as the S pole. The bar magnet 33 included in the second magnetic pole 3 is arranged so that the outer peripheral side serves as the S pole and the inner peripheral side serves as the N pole. The bar magnets 23 and 33 respectively included in the first magnetic pole 2 and the second magnetic pole 3 are arranged along the radial direction. Note that a black arrow in FIG. 4 indicates a magnetization direction of each of the first magnetic pole 2 and the second magnetic pole 3. The bar magnets 23 and 33 respectively included in the first magnetic pole 2 and the second magnetic pole 3 may be magnetized after being provided on the base material 1, or the bar magnets 23 and 33 magnetized in advance may be arranged and provided. Since portions other than the first magnetic pole 2 and the second magnetic pole 3 are similar to those of the rotation speed detector 10 according to the first embodiment, description thereof is omitted.

Here, a case is described as an example in which the first magnetic pole 2 and the second magnetic pole 3 respectively include the eight bar magnets 23 and 33. A width of each of the bar magnets 23 and 33 is set to 10 degrees of an angle in the rotation direction at the center in the radial direction. The bar magnets 23 and 33 are arranged at a pitch with an angle of 20 degrees, and intervals of 10 degrees are provided between the bar magnets 23 and between the bar magnets 33. That is, between the bar magnets 23 and between the bar magnets 33, the interval same as the magnet width is provided. The bar magnets 23 of the first magnetic pole 2 are arranged centering at positions of 20 degrees, 40 degrees, 60 degrees, 80 degrees, 100 degrees, 120 degrees, 140 degrees, and 160 degrees. The bar magnets 33 of the second magnetic pole 3 are arranged centering at positions of 200 degrees, 220 degrees, 240 degrees, 260 degrees, 280 degrees, 300 degrees, 320 degrees, and 340 degrees. The gap 7 is formed between the first magnetic pole 2 and the second magnetic pole 3 in an angular range of 30 degrees. In the rotation speed detector 10 according to the second embodiment, the first magnetic pole 2 is arranged in an angular range of 15 degrees to 165 degrees, and the second magnetic pole 3 is arranged in an angular range of 195 degrees to 345 degrees. The gaps 7 are arranged between 345 degrees and 15 degrees and between 165 degrees and 195 degrees.

Figure 5:
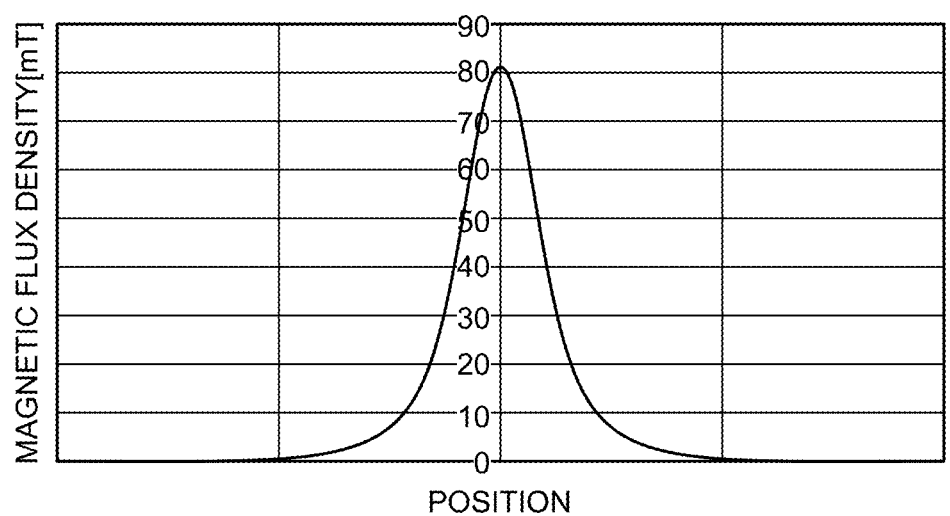
FIG. 5 is a diagram illustrating an example of a magnetic field generated by a bar magnet included in a first magnetic pole or a second magnetic pole of the rotation speed detector according to the second embodiment.

FIG. 5 is a diagram illustrating an example of a magnetic field generated by the bar magnet included in the first magnetic pole or the second magnetic pole of the rotation speed detector according to the second embodiment. The vertical axis in FIG. 5 represents a strength of a magnetic field in a radial direction, that is, a magnet longitudinal direction component; and the horizontal axis in FIG. 5 represents a position where the strength of the magnetic field is measured as a distance from the center of the magnet widths of the bar magnets 23 and 33. Note that the distance from the center of the magnet width of the bar magnets 23 and 33 can be approximated by a distance of the rotating body in the rotation direction. Furthermore, a width direction of the bar magnets 23 and 33 is a direction parallel to a surface on the base material 1 where the first magnetic pole 2 and the second magnetic pole 3 are provided and orthogonal to the longitudinal direction of the bar magnets 23 and 33. Furthermore, the position where the strength of the magnetic field is measured is fixed at a position apart from the bar magnets 23 and 33 toward the side of the power generation element 4 by a distance of a half of the magnet width, in a direction perpendicular to the surface of the base material 1. In FIG. 5, although a peak value of the magnetic field is 80 mT, the peak value changes depending on materials and thicknesses of the bar magnets 23 and 33. In the magnetic field generated by the bar magnets 23 and 33, a half bandwidth with respect to the peak value is about twice of the magnet width regardless of an absolute value of the peak value. That is, the half bandwidth that is a dimension in the width direction of the bar magnets 23 and 33 that is a dimension in a range where the magnetic field generated by the bar magnets 23 and 33 is equal to or more than a half of the peak is about twice of the width of the bar magnets 23 and 33. In the rotation speed detector 10 according to the second embodiment, the half bandwidth that is the width in which a magnetic field of 40 mT, which is a half value of the peak value, is generated is a twice of the magnet width.

Figure 6:
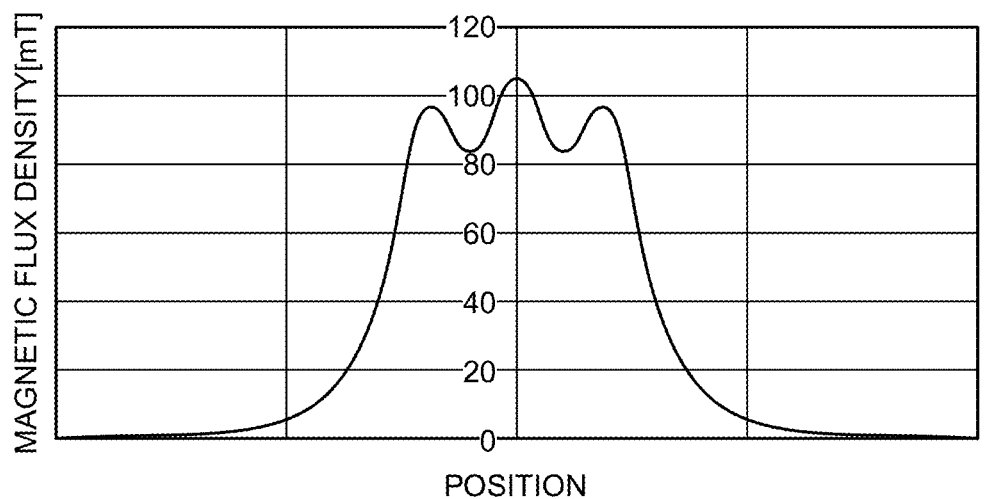
FIG. 6 is a diagram illustrating an example of a magnetic field generated in a case where three bar magnets configuring the first magnetic pole or the second magnetic pole of the rotation speed detector according to the second embodiment are arranged.
Figure 7:
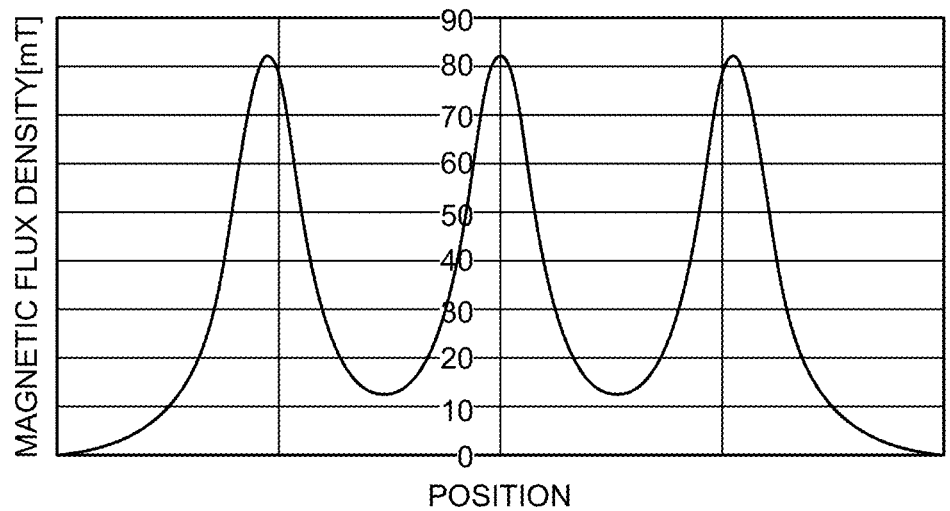
FIG. 7 is a diagram illustrating an example of the magnetic field generated in a case where the three bar magnets configuring the first magnetic pole or the second magnetic pole of the rotation speed detector according to the second embodiment are arranged.

FIGS. 6 and 7 are diagrams illustrating an example of the magnetic field generated in a case where the three bar magnets configuring the first magnetic pole or the second magnetic pole of the rotation speed detector according to the second embodiment are arranged. The vertical axis in FIGS. 6 and 7 represents a strength of a magnetic field in a radial direction, that is, a magnet longitudinal direction component, and the horizontal axis in FIGS. 6 and 7 represents a position where the strength of the magnetic field is measured as the distance from the center of the magnet widths of the bar magnets 23 and 33. Note that the distance from the center of the magnet width of the bar magnets 23 and 33 can be approximated by a distance of the rotating body in the rotation direction. Furthermore, a width direction of the bar magnets 23 and 33 is a direction parallel to a surface on the base material 1 where the first magnetic pole 2 and the second magnetic pole 3 are provided and orthogonal to the longitudinal direction of the bar magnets 23 and 33. Furthermore, the position where the strength of the magnetic field is measured is fixed at a position apart from the bar magnets 23 and 33 toward the side of the power generation element 4 by a distance of a half of the magnet width, in a direction perpendicular to the surface of the base material 1. FIG. 6 illustrates a magnetic field generated in a case where the three bar magnets 23 and 33 are arranged at intervals same as the magnet width. FIG. 7 illustrates a magnetic field generated in a case where the three bar magnets 23 and 33 are arranged with intervals that are twice of the magnet width. If the intervals of the bar magnets 23 and 33 are the same as the magnet width, the magnetic field exceeds 80 mT in a bottom portion during the peak, and it is found that a magnetic force stronger than that in a case where one each of the bar magnets 23 and 33 are included is obtained. On the other hand, if the intervals between the bar magnets 23 and 33 are twice of the magnet width, three peaks are separated, and the magnetic field drops to about 10 mT in the bottom portion during the peaks. Therefore, if 20 mT of a magnetic noise caused by an external magnetic field is applied in a negative direction at the bottom position of the peak, the magnetic field of −10 mT is applied to the magnetic wire 41, there is a possibility that power is erroneously generated at a positive that is not near the middle between the positive magnetic pole and the negative magnetic pole where power should be originally generated, and there is a problem in that the rotation speed is erroneously detected.

Figure 8:
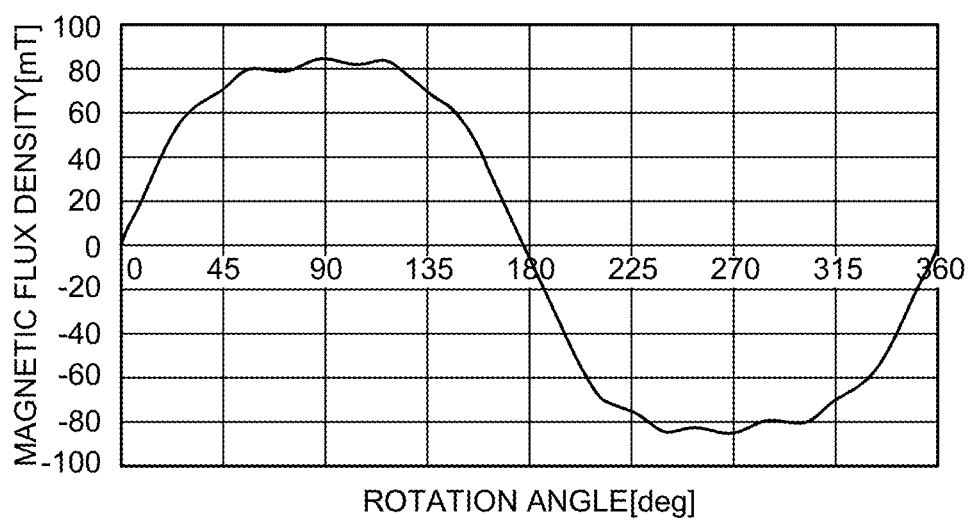
FIG. 8 is a diagram illustrating an example of a magnetic field generated by the rotation speed detector according to the second embodiment.

FIG. 8 is a diagram illustrating an example of a magnetic field generated by the rotation speed detector according to the second embodiment. In the rotation speed detector 10 according to the second embodiment, since a drop of the magnetic field hardly occurs in a portion where the first magnetic pole 2 and the second magnetic pole 3 are provided, the configuration is strong against the magnetic noise caused by the external magnetic field, and it is possible to enhance the reliability.

In the rotation speed detector 10 according to the second embodiment, the power generation element 4 generates a positive power generation pulse using a magnetic field of which a magnetic flux density is +10 mT as a trigger, and in a case where a negative power generation pulse is generated using the magnetic field of which the magnetic field is −10 mT as a trigger, the power generation pulse is generated by rotation of +10 degrees around zero degree or 180 degrees. The hysteresis H in this case is 20 degrees, similarly to the rotation speed detector 10 according to the first embodiment, even if the vibration of about two degrees of the angle in the rotation direction is generated in the rotating body in a state where the power generation element 4 faces the position near zero degree or 180 degrees, the power generation pulse is not generated, and the data is not written into the non-volatile memory 6. Therefore, there is no concern about a decrease in reliability such that a writing failure occurs due to continuous writing into the nonvolatile memory 6 in a short time and the life of the nonvolatile memory 6 is shortened because the number of times of writing reaches the upper limit of the number of times of writing into the nonvolatile memory 6.

In the rotation speed detector 10 according to the first embodiment, since the first magnetic pole 2 and the second magnetic pole 3 have arcuate strip shapes, in a case where a product group of which the inner and outer diameters of the first magnetic pole 2 and the second magnetic pole 3 are different is in lineup, it has been needed to create the first magnetic pole 2 and the second magnetic pole 3 for each product using a dedicated molding die and a magnetization device. On the other hand, in the rotation speed detector 10 according to the second embodiment, the inner diameters and the outer diameters of the first magnetic pole 2 and the second magnetic pole 3 can be easily changed by changing the number and positions of provided bar magnets 23 and 33. Therefore, even in a case where a product group of which the inner and outer diameters of the first magnetic pole 2 and the second magnetic pole 3 are different is in lineup, it is not needed to create the first magnetic pole 2 and the second magnetic pole 3 for each product using the dedicated molding die and the magnetization device. Therefore, for the rotation speed detector 10 according to the second embodiment, it can more easily create the first magnetic pole 2 and the second magnetic pole 3 than the rotation speed detector 10 according to the first embodiment, and cost can be reduced.

In the first embodiment and the second embodiment, it has been described that the rotation speed detector 10 has a form in which the gap 7 from which the base material 1 is exposed is provided between the first magnetic pole 2 and the second magnetic pole 3. However, the gap 7 may be provided in another configuration as long as the gap 7 has a non-magnetic property. For example, in the rotation speed detector 10, the base material 1 in a portion of the gap 7 indicated in the first embodiment and the second embodiment is hollowed, and the gap 7 may be provided as a space where all of the base material 1, the first magnetic pole 2, and the second magnetic pole 3 are not arranged. In this way, in the rotation speed detector 10, it is possible to provide the non-magnetic gap 7 between the first magnetic pole 2 and the second magnetic pole 3, by using air existing in the space between the first magnetic pole 2 and the second magnetic pole 3 as the gap 7.

Furthermore, for example, the rotation speed detector 10 may have a configuration in which the first magnetic pole 2 is arranged in the angular range of zero degree to 180 degrees of the base material 1, the second magnetic pole 3 is arranged in the angular range of 180 degrees to 360 degrees, and surfaces of the first magnetic pole 2 and the second magnetic pole 3 in a certain angular range are covered with a material indicating a non-magnetic property, using the center of the arc of the inner and outer diameters of the first magnetic pole 2 and the second magnetic pole 3 as the center point. As an example of the angular range covered with the material indicating the non-magnetic property, an angular range between 350 degrees and 10 degrees and an angular range between 170 degrees and 190 degrees can be exemplified. However, the angular range is not limited to this range. As the material indicating the non-magnetic property, an organic material such as resins, a nonmetallic inorganic material such as ceramics, a non-magnetic metal material, a composite material of these, or the like can be used. Note that, as an example of the non-magnetic metal material, copper, brass, aluminum, or the like can be exemplified. However, the non-magnetic metal material is not limited to these materials. By using the material indicating the non-magnetic property, it is possible to configure the rotation speed detector 10 in which the non-magnetic gap 7 is provided between the first magnetic pole 2 and the second magnetic pole 3.

The configurations illustrated in the above embodiments indicate an example of content and can be combined with other known technique. Furthermore, the configurations illustrated in the embodiments can be partially omitted or changed without departing from the scope.

REFERENCE SIGNS LIST

1 base material; 2 first magnetic pole; 3 second magnetic pole; 4 power generation element; 5 counter IC; 6 nonvolatile memory; 7 gap; 10 rotation speed detector; 21, 22, 31, 32 magnet; 23, 33 bar magnet; 41 magnetic wire; 42 pickup coil; 43 magnetic yoke.

The invention claimed is:

1. A rotation speed detector comprising:
   a non-magnetic base material to be attached to a rotating body;
   a first magnetic pole having an arcuate strip shape and provided on the base material such that an outer peripheral side serves as an N pole and an inner peripheral side serves as an S pole;
   a second magnetic pole having an arcuate strip shape and provided on the base material such that an outer peripheral side serves as the S pole and an inner peripheral side serves as the N pole; and
   a power generation element including, a magnetic wire configured to cause a large Barkhausen effect, and a pickup coil configured to detect magnetization reversal of the magnetic wire, wherein
   the power generation element is arranged to face the first magnetic pole and the second magnetic pole so that a longitudinal direction of the magnetic wire is provided along a radial direction of the first magnetic pole and the second magnetic pole, and a non-magnetic gap is provided between the first magnetic pole and the second magnetic pole, wherein each of the first magnetic pole and the second magnetic pole includes a plurality of bar magnets, and an installation interval of the plurality of bar magnets included in the first magnetic pole and the second magnetic pole is equal to or less than a half of a half bandwidth, wherein the half bandwidth is a dimension in a direction parallel to a surface of the base material on which the first magnetic pole and the second magnetic pole are provided and orthogonal to a longitudinal direction of the bar magnet and is a dimension of a range in which a magnetic field generated by the bar magnet is equal to or more than a half of a peak.

2. The rotation speed detector according to claim 1, wherein the gap is larger than a vibration width in a rotation direction generated in the rotating body.

* * * * *